(12) United States Patent
Guetter

(10) Patent No.: US 10,794,379 B2
(45) Date of Patent: Oct. 6, 2020

(54) SUMP PUMP CONTROL

(71) Applicant: Alderon Industries, Inc., Hawley, MN (US)

(72) Inventor: Alexander Richard Guetter, Detroit Lakes, MN (US)

(73) Assignee: Alderon Industries, Inc., Hawley, MN (US)

(*) Notice: Subject to any disclaimer, the term of this patent is extended or adjusted under 35 U.S.C. 154(b) by 150 days.

(21) Appl. No.: 15/888,782

(22) Filed: Feb. 5, 2018

(65) Prior Publication Data

US 2019/0242374 A1    Aug. 8, 2019

(51) Int. Cl.
| | |
|---|---|
| *F04B 49/04* | (2006.01) |
| *F04B 49/025* | (2006.01) |
| *G05B 23/02* | (2006.01) |
| *F04B 23/02* | (2006.01) |
| *H01H 35/18* | (2006.01) |

(52) U.S. Cl.
CPC .......... *F04B 49/025* (2013.01); *F04B 23/021* (2013.01); *F04B 49/04* (2013.01); *G05B 23/027* (2013.01); *F04B 2207/70* (2013.01); *H01H 35/18* (2013.01)

(58) Field of Classification Search
CPC ...... F04B 23/021; F04B 49/025; F04B 49/04; H01H 35/18; H01H 36/02
See application file for complete search history.

(56) References Cited

U.S. PATENT DOCUMENTS

| | | |
|---|---|---|
| 6,140,925 A | 10/2000 | Lee et al. |
| 8,737,672 B1 | 5/2014 | George |

FOREIGN PATENT DOCUMENTS

WO    WO2019/148541    *  8/2019

* cited by examiner

*Primary Examiner* — Ramon M Barrera
(74) *Attorney, Agent, or Firm* — Fredrikson & Byron, P.A.

(57) ABSTRACT

An exemplary apparatus includes a switch, an arm, and a rod. The switch is housed by a housing and includes an actuating tab. The arm is housed by the housing and carries an arm magnet. The arm magnet includes first and second opposed surfaces and an edge surface. The rod carries a float and a rod magnet. The rod is movable between a first rod position and a second rod position at which the rod magnet is in the housing. As the rod moves from the first position to the second position, the edge surface of the arm magnet is configured to move across a facing surface of the rod magnet, thereby moving the arm from a first arm position in which the arm does not actuate the actuating tab to a second arm position in which the arm actuates the actuating tab.

22 Claims, 9 Drawing Sheets

SUMP PUMP CONTROL

TECHNICAL FIELD

This disclosure generally relates to apparatuses, systems, and methods for monitoring and/or controlling an electrical load device. For example, various embodiments can be used to monitor and/or control a sump pump.

BACKGROUND

Many electrical load devices are selectively run when a certain condition is present in order to address such condition. These electrical load devices can thus cycle between on and off states as often as the corresponding condition presents itself. To turn these electrical load devices on and off, a component can be included to detect the presence of the relevant condition and, as a result, cause the electrical load device to change from an off state to an on state, or vice versa.

One example of such an electrical load device is a sump pump. A sump pump can be used to remove fluid from a holding basin. For instance, when a predetermined amount of fluid becomes present within the holding basin the sump pump can be turned on to remove fluid from the holding basin. Once an appropriate amount of fluid is removed from the holding basin, the sump pump can be turned off. Thus, the sump pump can be cycled on and off as often as the predetermined amount of fluid is present within the holding basin.

SUMMARY

In general, various exemplary embodiments relating to apparatuses, systems, and methods for monitoring and/or controlling an electrical load device are disclosed herein. In particular, such embodiments are disclosed, in illustrative examples herein, for monitoring and/or controlling a sump pump.

As one example, these embodiments may be useful in helping to provide a longer useful life to a switch that is used to actuate a sump pump. For instance, these embodiments can include an arm that provides improved actuation of the switch in a way that reduces wear on the switch over the course of sump pump cycling. As a result, various embodiments disclosed herein can facilitate cost-effective control of the sump pump.

As another example, certain embodiments disclosed herein may allow for improved monitoring of the sump pump. For instance, some embodiments can track instances of sump pump actuation and provide information related to this tracking. This can be useful in maintaining the sump pump. For example, this tracking can inform a user when a predetermined amount of time has passed without actuation of the sump pump. This tracking may even be used to cause the sump pump to run when a predetermined amount of time has passed without actuation of the sump pump and as such act to help maintain the sump pump in an appropriate condition despite lack of routine pump usage. In another instance, some embodiments can provide a form of failsafe monitoring. These embodiments can monitor for the presence of a certain amount of fluid (e.g., within the basin) that indicates the sump pump, or related pump actuation component(s), may not be operating properly. This can allow a user to be alerted as to a potential issue prior to detrimental consequences that otherwise could result due to the pump, or related component, failure. Moreover, certain embodiments can allow for convenient monitoring, including the monitoring described above, and/or control of a sump pump at a remote user computing device.

One exemplary embodiment includes an apparatus that can, for instance, turn a sump pump on and/or off. This exemplary apparatus embodiment includes a switch, an arm, and a rod. The switch is housed by a housing and includes an actuating tab. The arm is housed by the housing and carries an arm magnet. The arm magnet includes first and second opposed surfaces and an edge surface. The rod carries a float and a rod magnet. The rod magnet includes a facing surface. The rod is movable between a first rod position and a second rod position. When the rod is in the second rod position, the rod magnet is in the housing. As the rod moves from the first rod position to the second rod position, the edge surface of the arm magnet is configured to move across the facing surface of the rod magnet, thereby moving the arm from a first arm position in which the arm does not actuate the actuating tab to a second arm position in which the arm actuates the actuating tab. And, as the rod moves from the second rod position to the first rod position, the arm is configured to move from the second arm position to the first arm position.

In some cases, a further embodiment of this exemplary apparatus can include a counter component configured to monitor one or more components of the apparatus. As one example, the counter can be configured to monitor instances in which the switch (e.g., via the actuating tab) is actuated. In one such embodiment, the counter may be configured to track instances when the arm moves between the first arm position and the second arm position. By tracking a number of instances that the arm moves between the first arm position and the second arm position the counter can allow information pertaining to use of the apparatus (e.g., frequency of use) to be gathered.

Certain embodiments of the exemplary apparatus can include one or more components for backup pump control. In one embodiment, the exemplary apparatus can include a secondary float and a monitor. The secondary float may not be carried by the rod and can be movable independent of the rod. The monitor can be configured to detect when the secondary float has moved from one position to another (e.g., from a first secondary float position to a second secondary float position that corresponds to a higher water level than the first secondary float position). For example, the secondary float can be configured to move upwardly from one position to another after the float, carried by the rod, is supposed to have moved the rod to the second rod position.

Another exemplary embodiment includes a system that can, for instance, monitor and/or control a sump pump. This exemplary system embodiment includes an apparatus and a remote server. The apparatus can include a housing, a switch, an arm, and a rod. The switch is housed by the housing and includes an actuating tab. The arm is housed by the housing and carries an arm magnet. The arm magnet includes first and second opposed surfaces and an edge surface. The rod carries a float and a rod magnet. The rod magnet includes a facing surface. The rod is movable between a first rod position and a second rod position. When the rod is in the second rod position, the rod magnet is in the housing. As the rod moves from the first rod position to the second rod position, the edge surface of the arm magnet is configured to move across the facing surface of the rod magnet, thereby moving the arm from a first arm position in which the arm does not actuate the actuating tab to a second arm position in which the arm actuates the actuating tab. As the rod moves from the second rod position to the first rod position, the arm is configured to move from the second arm position to the first arm position. The remote server can be configured for wireless communication with the apparatus to receive data related to the sump pump. The remote server can also be configured to transmit data related to the sump pump to a remote user computing device.

In some cases, in a further embodiment of this exemplary system the apparatus can include one or more communication components to send signals to and/or receive signals from the remote server. For instance, the apparatus may include a transmitter configured to transmit data to the remote server and/or a receiver configured to receive a control signal (e.g., representing a command, such as to turn the sump pump on or off) from the remote server. In certain embodiments of the exemplary system, the apparatus can communicate with the remote server through a control panel. The control panel can be a local control panel at the site of the apparatus and the control panel can be in communication with the apparatus and the remote server. In one example, the control panel can receive a control signal (e.g., representing a command, an operational setting, etc.) from the remote server and convey a corresponding signal to the apparatus. In this way, a remote user computing device can send a control signal to the apparatus through the remote server and control panel and/or receive data relating to the sump pump though the control panel and the remote server.

A further exemplary embodiment includes a method of turning a sump pump on and/or off. This exemplary method can include moving a rod, carrying a rod magnet, from a first rod position to a second rod position. The exemplary method may further include moving an arm, carrying an arm magnet, from a first arm position to a second arm position. The arm can be moved from the first arm positon to the second arm position as the rod is moved from the first rod positon to the second rod position at which the rod magnet is inside a housing. As the arm moves from the first arm positon to the second arm position, an edge surface of the arm magnet can move across a facing surface of the rod magnet. The exemplary method can also include actuating a switch when the arm is moved to the second arm position. In some instance, actuating the switch can include actuating an actuating tab of the switch with the arm in the second arm position.

The details of one or more examples are set forth in the accompanying drawings and the description below. Other features, objects, and advantages will be apparent from the description and drawings.

BRIEF DESCRIPTION OF DRAWINGS

The following drawings are illustrative of particular embodiments of the present invention and therefore do not limit the scope of the invention. The drawings are not necessarily to scale (unless so stated) and are intended for use in conjunction with the explanations in the following description. Embodiments of the invention will hereinafter be described in conjunction with the appended drawings, wherein like numerals denote like elements.

FIG. 2A shows a rod of the apparatus at a first rod position and FIG. 2B shows the rod of the apparatus at a second rod position.

FIG. 3A shows an arm of the apparatus at a first arm position and FIG. 3B shows the arm of the apparatus at a second arm position.

FIG. 5A shows a first fluid level and FIG. 5B shows a second elevated fluid level at which the monitoring unit can serve as a backup sump pump control.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1:
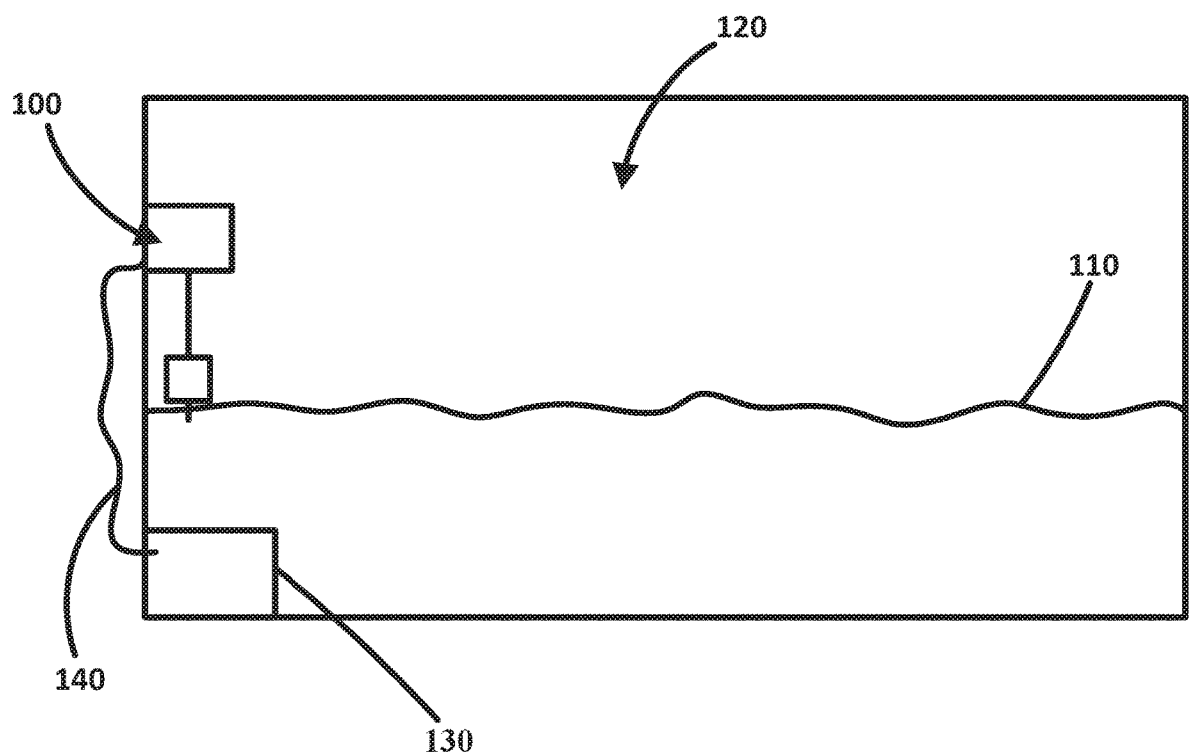
FIG. 1 is a schematic, side elevational diagram of a basin within which an apparatus for turning a sump pump on and off is positioned.

FIG. 1 illustrates a schematic, side elevational diagram of a basin 120 which can receive and hold fluid. Over time, the amount of fluid within the basin 120 can change. As the amount of fluid within the basin 120 changes, a fluid level 110 within the basin 120 will correspondingly change. When the fluid level 110 reaches a preset level, a sump pump 130 can be used to remove fluid from the basin 120. Accordingly, the sump pump 130 can be useful in maintaining the fluid level 110 within the basin 120 at or below an appropriate level.

An apparatus 100 can be positioned within the basin 120. The apparatus 100 can be used to turn the sump pump 130 on and/or off. When the fluid level 110 reaches the preset level within the basin 120, the apparatus 100 can cause the sump pump 130 to turn on and remove fluid from the basin 120. For instance, the apparatus 100 can detect the fluid level 110 reaching the preset level and, as a result, send electrical potential to the sump pump 130 over a line 140 to cause the sump pump 130 to turn on. Likewise, in some cases, the apparatus 100 may be able to detect the fluid level 110 falling below the same preset level, or a different preset level, and cause the sump pump 130 to turn off. Thus, the apparatus 100 may monitor the fluid level 110 within the basin 120 and act to control the sump pump 130.

Figure 2A:
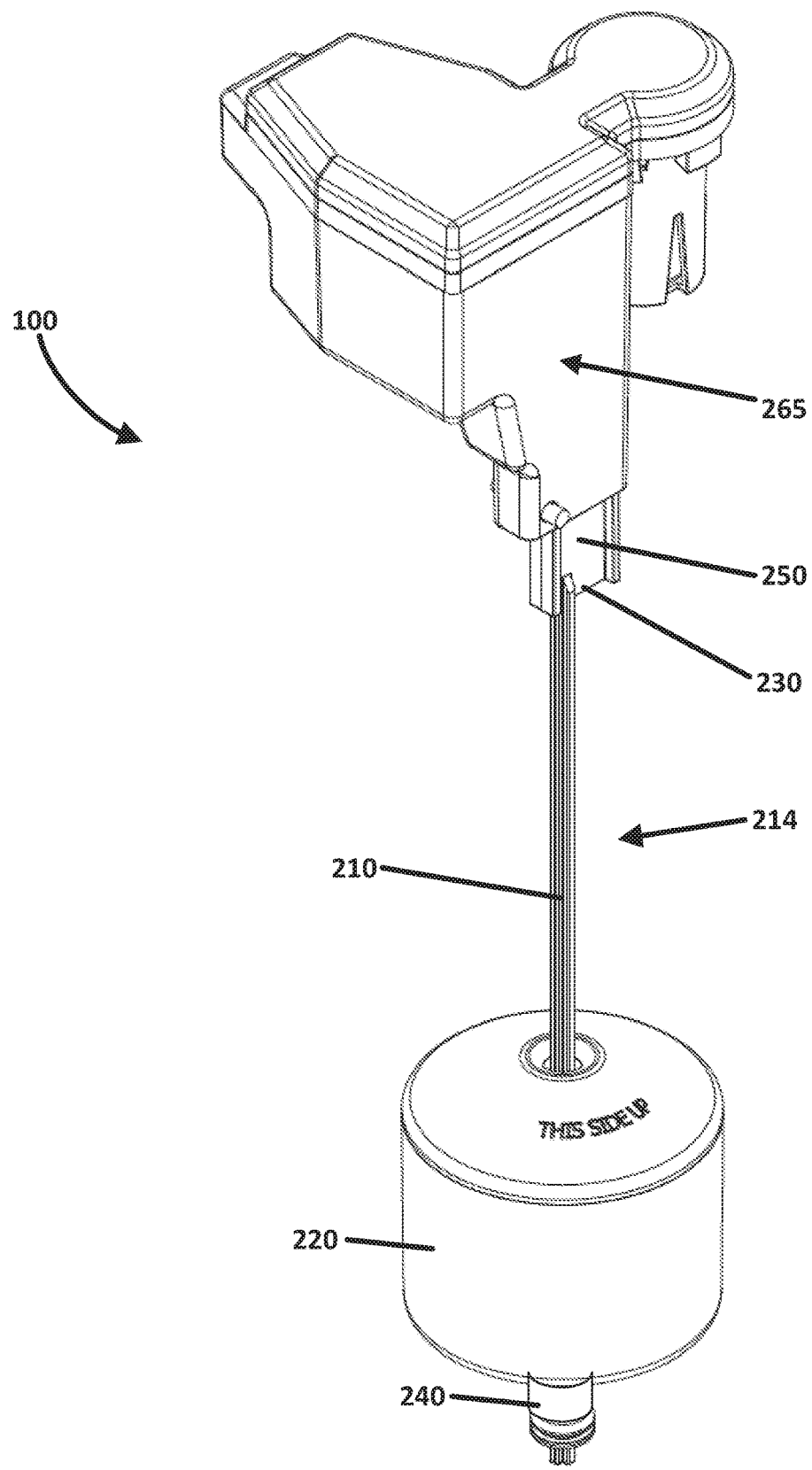
FIGS. 2A and 2B are perspective views of an exemplary embodiment of the apparatus of FIG. 1.
Figure 2B:
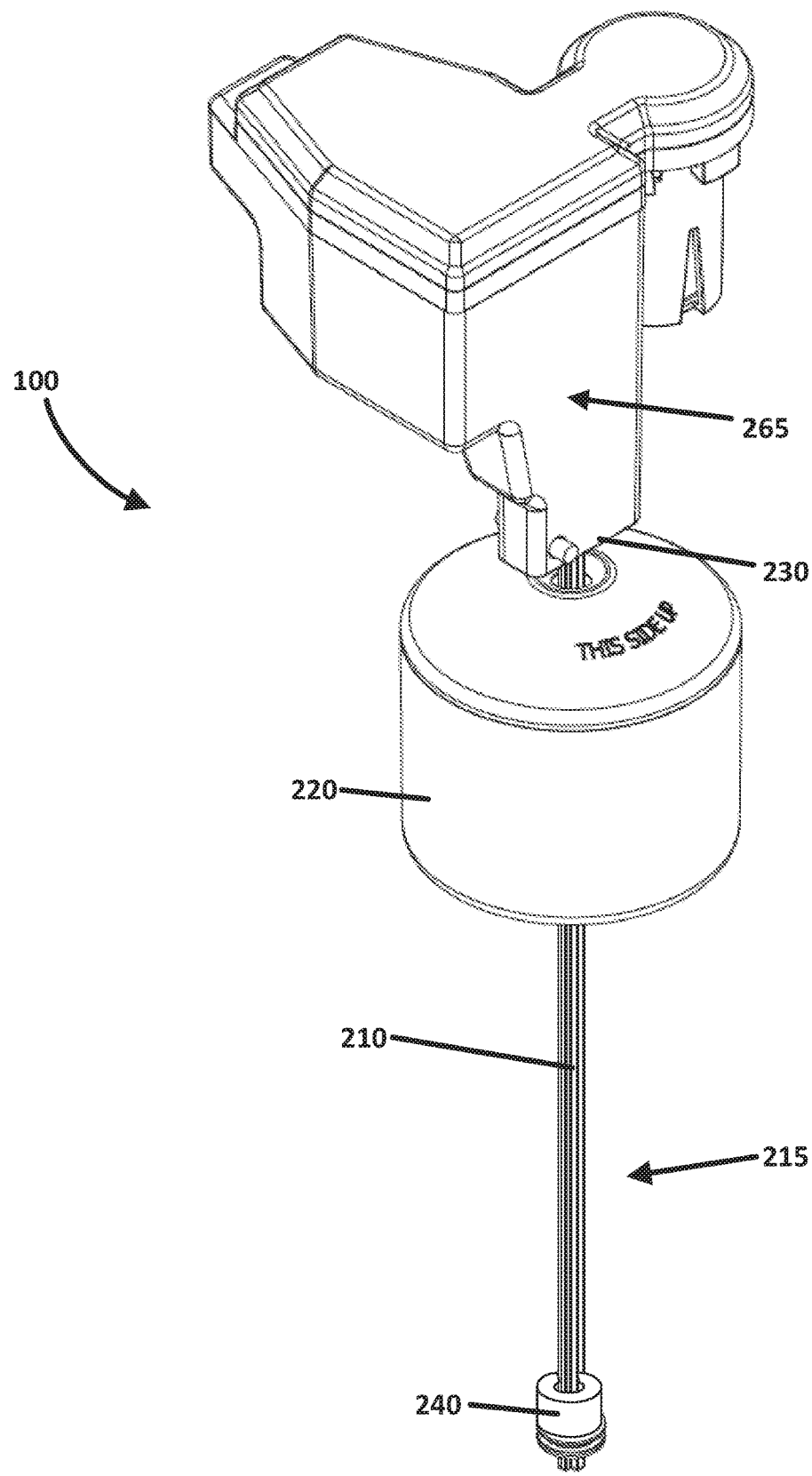

FIGS. 2A and 2B are perspective views of an exemplary embodiment of the apparatus 100. As will be described, FIGS. 2A and 2B illustrate the apparatus 100 in use at two different fluid levels. In use, as the fluid level changes from that corresponding to FIG. 2A to that corresponding to FIG. 2B one or more components of the apparatus 100 can move from one position to another.

The exemplary apparatus 100, as shown in FIGS. 2A and 2B, includes a housing 265 and a rod 210. The rod 210 can move relative to the housing 265. For instance, the housing 265 may be fixed in place (e.g., at the basin) while the rod 210 can be movable relative to the housing 265 as the fluid level changes. Namely, as the fluid level changes, the rod 210 can move between a first rod position 214, an example of which is shown in FIG. 2A, and a second rod position 215, an example of which is shown in FIG. 2B. The rod 210 can carry a rod magnet, for instance at a magnet carrier 250 on the rod 210, and the rod magnet can be in the housing 265 when the rod is in the second rod position 215.

In the illustrated embodiment of the apparatus 100, the rod 210 carries a float 220 which can cause the rod 210 to move between the first rod position 214 and the second rod position 215. The float 220 can be made up of a material such that the float 220 is buoyant on a surface of the fluid level and moves as the fluid level changes. The float 220 can be movably connected to the rod 210. Depending on the fluid level, in certain instances the float 220 can move relative to the rod 210. For example, in the illustrated embodiment, the rod 210 includes a first float stop 230 and a second float stop 240. These float stops 230, 240 may be fixed in place at the rod 210. In the embodiment shown here, the float 220 can move relative to the rod 210 between the first and second float stops 230, 240. When the fluid level is below the second float stop 240, the float 220 can rest on the second float stop 240 as shown in FIG. 2A. As the fluid level rises past the second float stop 240, the float 220 can move relative to the rod 210 in a direction toward the housing 265 and the first float stop 230. As the fluid level continues to rise, the float 220 will reach the first float stop 230. At this point, the float 220 can act to movably force the rod 210 to the second rod position 215, shown in FIG. 2B. At this second rod position 215, the rod magnet can be in the housing 265. Accordingly, as the float 220 engages the first float stop 230 the rod 210 can be configured to move from the first rod position 214 to the second rod position 215.

The float 220 can serve in a similar manner to move the rod 210 from the second rod position 215 to the first rod positon 214. As the fluid level falls below the first float stop 230, the float 220 will move in a direction toward the second float stop 240 and thereby release the rod 210 from the second rod position 215. As the fluid level continues to fall, the float 220 can move toward the second float stop 240 (e.g., relative to the rod 210) until the fluid level falls to the second float stop 240 at which point the float 220 will ultimately rest on the second float stop 240, as shown in FIG. 2A. Accordingly, as the float 220 moves toward and/or engages the second float stop 240 the rod 210 can be configured to move from the second rod position 215 to the first rod position 214. In some embodiments, when the rod 210 is at the first rod position 214 some or all of the rod magnet may be outside of the housing 265.

Figure 3A:
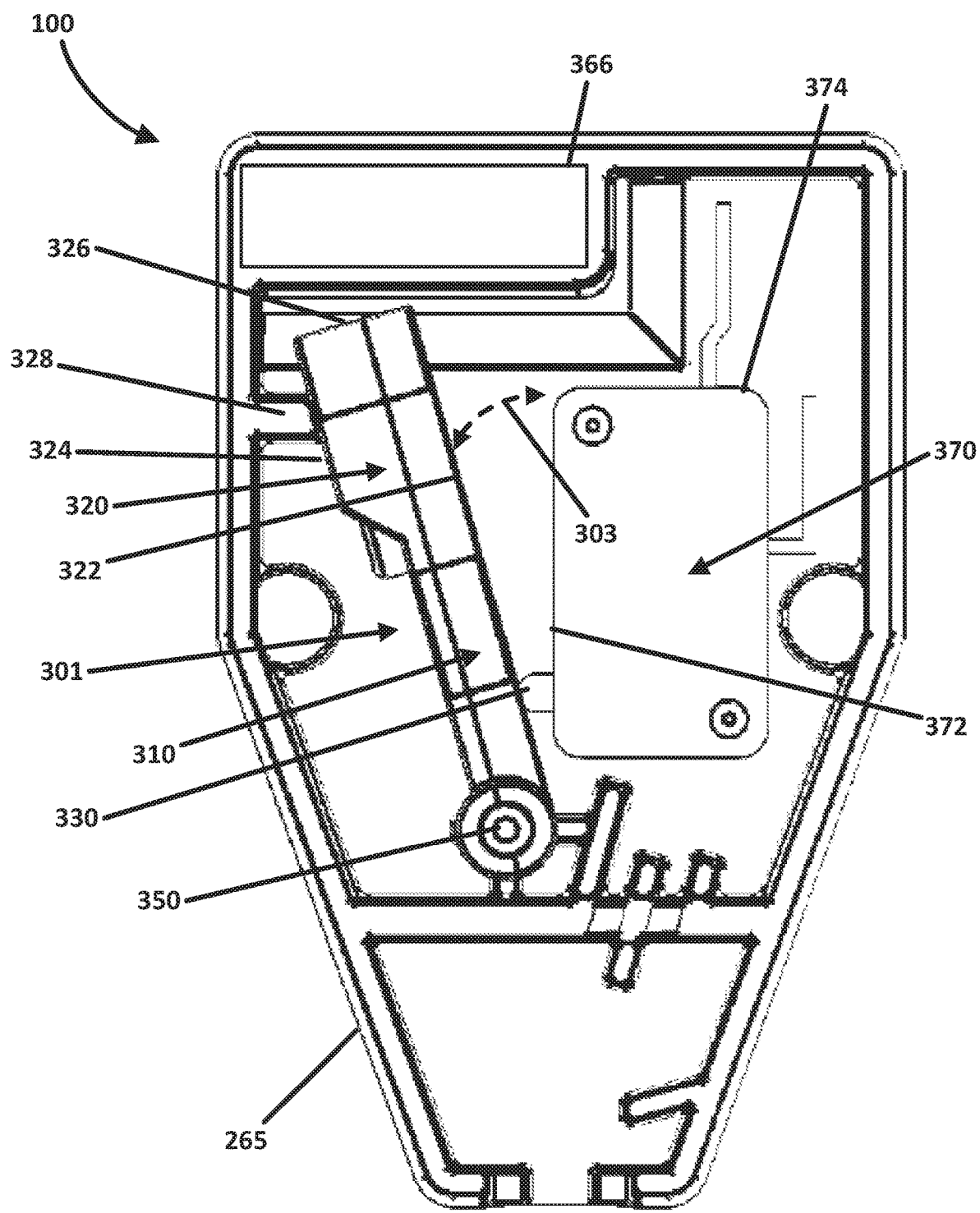
FIGS. 3A and 3B are plan views of the exemplary embodiment of the apparatus of FIGS. 2A and 2B.
Figure 3B:
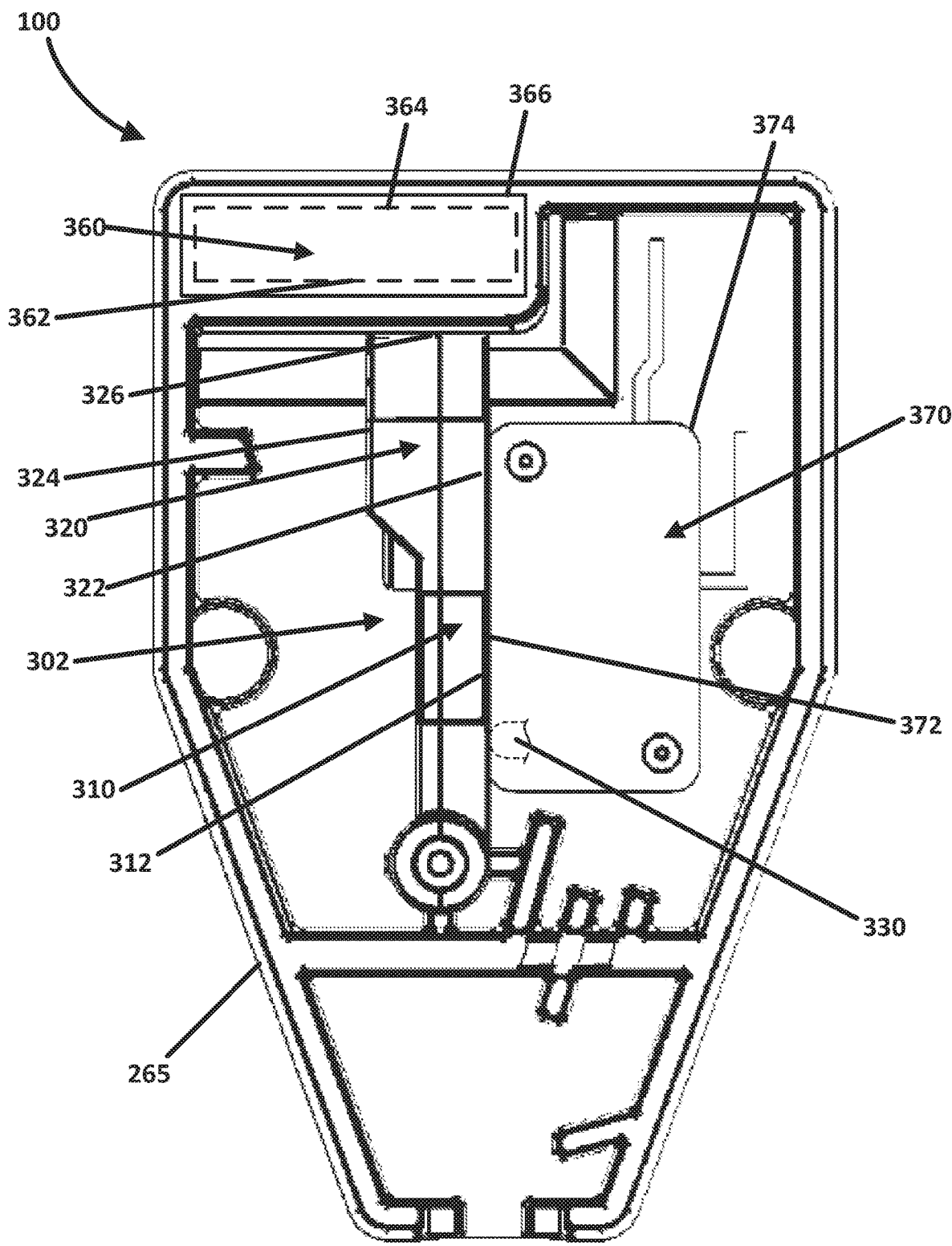

FIGS. 3A and 3B are plan views of the exemplary embodiment of the apparatus 100. A portion of the housing 265 has been removed in these exemplary illustrations in order to show certain components that may be housed within the housing 265 of the apparatus 100. FIG. 3A shows components of the apparatus 100 when the rod is at the first rod position, for instance as shown in FIG. 2A, and FIG. 3B shows components of the apparatus 100 when the rod is at the second rod position, for instance as shown in FIG. 2B. As will be described, as the rod moves between the first rod position and the second rod position one or more components of the apparatus 100 can also be configured to move from one position to another.

As shown in the illustrated embodiment, the apparatus 100 can include an arm 310. The arm 310 can be housed by the housing 265 and be configured to move between arm positions. The arm 310 can carry an arm magnet 320. The arm magnet 320 may be fixed to a portion of the arm 310 such that the arm magnet 320 moves along with the arm 310. The arm magnet 320 can include an edge surface 326, a first opposed surface 322, and a second opposed surface 324. In the example shown, the first opposed surface 322 and the second opposed surface 324 can be surfaces of the arm magnet 320 that are opposite one another. Also in the example shown, the edge surface 326 can be a surface of the arm magnet 320 that extends between the first and second opposed surfaces 322, 324. The first opposed surface 322 can have a first magnetic charge while the second opposed surface 324 can have a second magnetic charge that is opposite the first magnetic charge.

The apparatus 100 can further include a switch 370. The switch 370 can include a switch housing 374 and can be housed, at least partially, by the housing 265. When actuated, the switch 370 can be configured to turn the sump pump on. To actuate the switch 370, the switch 370 can include an actuating tab 330. In the illustrated example, the switch 370 includes a flat switch surface 372, shown here forming a surface of the switch housing 374. FIG. 3A shows the actuating tab 330 in a first, or open, tab position at which the actuating tab 330 protrudes from the flat switch surface 372. The actuating tab 330 can be biased to the first tab position, for instance by a biasing member of the switch 370. FIG. 3B shows the actuating tab 330 in a second, or closed, tab position at which the actuating tab 330 is moved within the switch housing 374. Moving the actuating tab 330 between the first tab position, in FIG. 3A, to the second tab position, in FIG. 3B, can actuate the switch 370. Thus, in the described example, the switch 370 can be configured to turn on the sump pump when the actuating tab 330 is actuated. For instance, actuating the actuating tab 330 can cause the switch 370 to close a circuit which in turn can act to send electrical potential to the sump pump.

The arm 310 can be configured to actuate the actuating tab 330. To do so, the arm 310 can move from a first arm position 301, an example of which is shown in FIG. 3A, to a second arm position 302, an example of which is shown in FIG. 3B. In the first arm position 301 the arm 310 does not actuate the actuating tab 330, while in the second arm position 302 the arm 310 actuates the actuating tab 330. An arrow 303 is shown in FIG. 3A as one example of arm 310 movement between the first arm position 301 and the second arm position 302.

The rod can be configured to move the arm 310 between the first arm position 301 and the second arm position 302. FIG. 3A shows the apparatus 100 when the rod is at the first rod position and the arm 310 is at the first arm position 301. FIG. 3B shows the apparatus 100 when the rod is at the second rod position and the arm 310 is at the second arm position 302. As described previously, the rod can carry a rod magnet 360 that is in the housing 265 when the rod is at the second rod position. The rod magnet 360 can include a facing surface 362 and a back surface 364 that is opposite the facing surface 362. Movement of the rod from the first rod position (e.g., shown in FIG. 2A) to the second rod position (e.g., shown in FIG. 2B) can act to move the arm 310 from the first arm position 301 to the second arm position 302 and actuate the actuating tab 330. As the rod moves from the first rod position to the second rod position, the edge surface 326 of the arm magnet 320 is configured to move across the facing surface 362 of the rod magnet 360, thereby moving the arm 310 from the first arm position 301 to the second arm position 302. Likewise, as the rod moves from the second rod position to the first rod position, the arm 310 is configured to move from the second arm position 302 to the first arm position 301.

A number of designs can be used to facilitate movement of the arm 310 between the first arm position 301 and the second arm position 302 as described. As one example, when the rod magnet 360 is in the housing 265 and moved toward the arm magnet 320 at the second rod position, the rod magnet 360 can be configured to use magnetic force to move the arm 310. For instance, the facing surface 362 of the rod magnet 360 can have a first magnetic charge that is the same as the first magnetic charge of the first opposed surface 322 of the arm magnet 320 and opposite of the second magnetic charge of the second opposed surface 324 of the arm magnet 320. Accordingly, to move the arm 310 from the first arm position 301 to the second arm position 302 the rod magnet 360 can be configured to repel the first opposed surface 322 of the arm magnet 320 and attract the second opposed surface 324 of the arm magnet 320.

As the rod is moved from the second rod position to the first rod position, the rod magnet 360 is moved away from the arm magnet 320 and thereby can eliminate the magnetic force used to move the arm 310 from the first arm position 301 to the second arm position 302. As the magnetic force is eliminated, in one embodiment the actuating tab 330 can be used to move the arm 310 from the second arm position 302 back to the first arm position 301. As previously described, the actuating tab 330 can be biased in the first, or open, position at which it protrudes out from the flat switch surface 372. However, when the arm 310 is moved from the first arm position 301 to the second arm position 302 due to the magnetic force the bias force on the actuating tab 330 is overcome causing the actuating tab 330 to move to the second, or closed, tab position at which the actuating tab 330 is moved within the switch housing 374. But, when the magnetic force is eliminated, the bias force on the actuating tab 330 can act to move the arm 310 from the second arm position 302 to the first arm position 301. Thus, the actuating tab 330 can be configured to push the arm 310 from the second arm position 302 to the first arm position 301 as the rod moves from the second rod position to the first rod position. Moreover, the actuating tab 330 may also be configured to keep the arm 310 in the first arm position 301 until the rod moves back to the second rod position.

In the example shown here, the arm 310 pivots as it moves between the first arm position 301 and the second arm position 302. In particular, in this example the arm 310 pivots about a support 350 as it moves between the first arm position 301 and the second arm position 302. The support 350 can be included at the housing 265. The arm magnet 320 can be carried by the arm 310 at a location on the arm 310 that is spaced from the support 350. As shown in FIG. 3A, when at the first arm position 301 the arm 310 can rest on an arm stop 328. The arm stop 328 may be fixed in place at the housing 265. As the rod is moved from the first rod positon to the second rod position, and thus the rod magnet 360 is moved toward the arm magnet 320, the arm 310 can move off of the arm stop 328 and pivot about the support 350 in a first direction. As shown in FIG. 3B, to help position the rod magnet 360 some embodiments can include a housing stop 366 at a location of the housing 265 where the rod magnet 360 will be aligned in range to impart magnetic force to move the arm 310. When the rod is moved from the second rod position to the first rod position, and thus the rod magnet 360 is moved away the arm magnet 320, the arm 310 can similarly pivot about the support 350 but in a second opposite direction until coming into contact with the arm top 328.

The first and second arm positions 301, 302 can include a variety of relative component orientations. As shown in the illustrated embodiment, when the arm 310 is in the second arm position 302 the first and second opposed surfaces 322, 324 of the arm magnet 320 are oriented substantially perpendicularly to the facing surface 362 of the rod magnet 360. The first opposed surface 322 of the arm magnet 320 can be positioned nearer to the actuating tab 330 than is the second opposed surface 324 of the arm magnet 320. As also shown in this embodiment, when the arm 310 is in the second arm position 302 the edge surface 326 of the arm magnet 320 is oriented substantially parallel to the facing surface 362 of the rod magnet 360.

The configuration and movement of the arm 310 as described in examples herein can actuate the switch 370 in a way that reduces wear on the switch over the course of switch cycling. In various embodiments, the arm 310 can include a flat arm surface 312. When the edge surface 326 of the arm magnet 320 moves across the facing surface 362 of the rod magnet 360, the arm 310 is moved to the second arm position 302 at which the flat arm surface 312 can be positioned flush against the flat switch surface 372. In some cases, this can result in fully moving the actuating tab 330 to the second, or closed, tab position where the actuating tab 330 is completely moved within the switch housing 374. In turn, this can cause the switch 370 to fully close. By fully closing the switch 370, the useful life of the switch 370 can be prolonged. For example, in cases where the switch 370 is only partially closed sparking, or other detrimental conditions, may result and act to reduce the useful life of the switch 370. The configuration and movement of the arm 310 in the examples herein may provide improved closing of the switch 370 which in turn can provide a more cost-effective means for turning the sump pump, or other electrical load device, on and off.

In some embodiments, the apparatus may include one or more features that can be useful for monitoring operation of the apparatus. For instance, some embodiments can track instances of sump pump actuation and provide information related to this tracking. In another instance, some embodiments can provide a form of failsafe monitoring to indicate that the sump pump, or related pump actuation component(s), may not be operating properly. Certain such embodiments can allow for remote monitoring and/or control at a remote user computing device.

Figure 4:
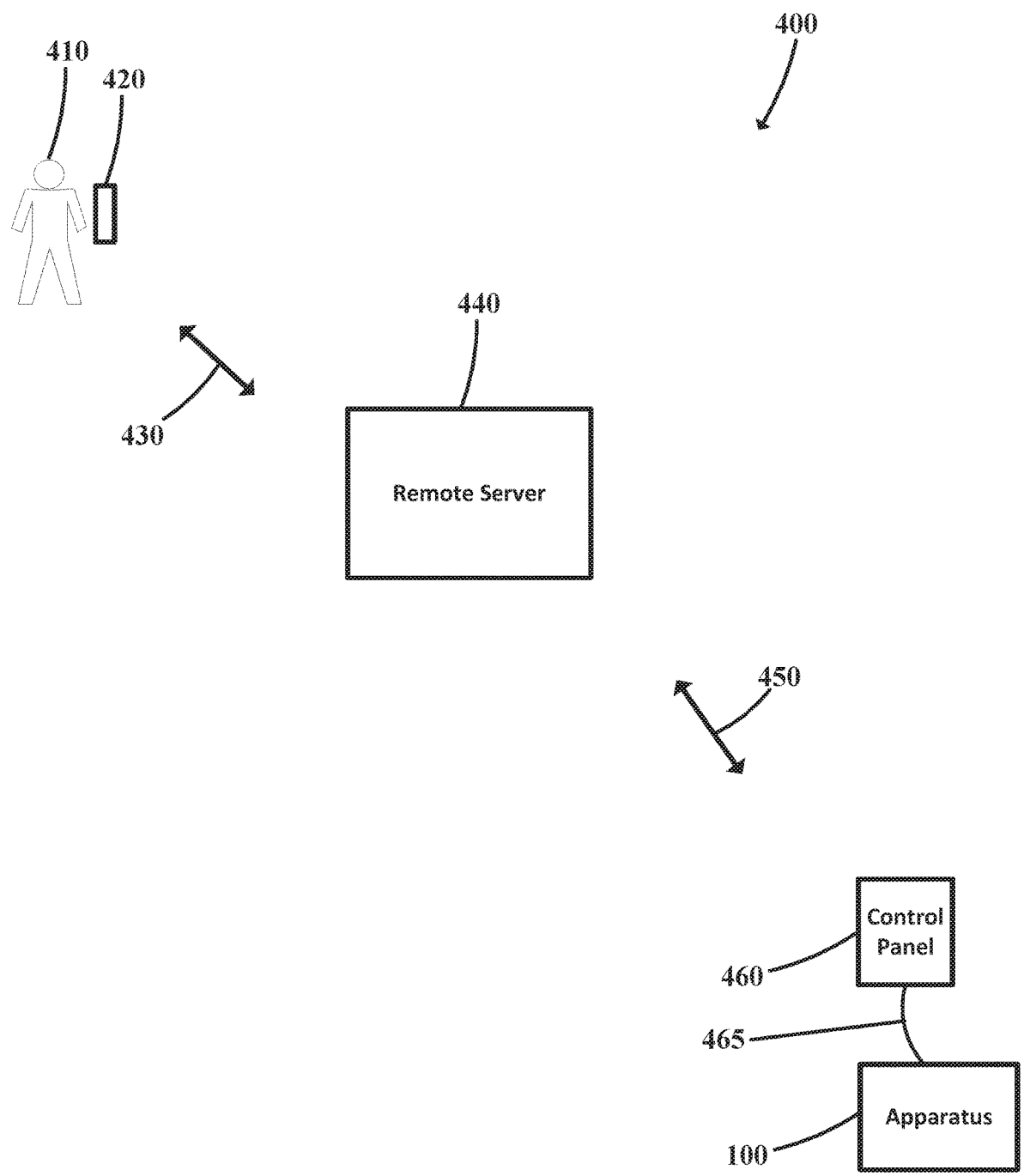
FIG. 4 is a schematic diagram of an exemplary embodiment of a system for monitoring a sump pump.

FIG. 4 is a schematic diagram of an exemplary embodiment of a system 400 for monitoring the sump pump. The exemplary system 400 includes the apparatus 100, as described previously, and a remote server 440. In some embodiments, the system 400 can further include a computing device 420 (e.g., personal computer, cellular phone) associated with a remote user 410. The computing device 420 can be at a location that is different than the location of the apparatus 100 and the remote server 440. In certain embodiments, the system 400 can also include a control panel 460 though other embodiments need not have the control panel 460. When present, the control panel 460 can be a local control panel at the site of the apparatus 100.

The system 400 can allow information related to the apparatus 100 to be sent to either, or both of, the remote server 440 and the computing device 420. In addition, the system 400 can allow a control signal to be sent from either, or both of, the remote server 440 and the computing device 420 to the apparatus 100. In some cases, the remote server 440 and/or the computing device 420 can store and execute a local software application to facilitate communication of the information and/or control signal. As shown in FIG. 4, the apparatus 100 and the remote server 440 can be in communication over a communication line 450, and the remote server 440 and the computing device 420 can be in communication over a communication line 430. In some cases, the communication lines 430, 450 can each be a wireless communication link over a wide area network or a local area network. In the illustrated embodiment, the remote server 440 can be configured for wireless communication with the apparatus 100 to receive data related to the sump pump and configured to transmit data related to the sump pump to the computing device 420 associated with the remote user 410. While the embodiment of the system 400 in FIG. 4 shows the apparatus 100 in communication with the computing device 420 via the remote server 440, in certain embodiments the apparatus 100 and the computing device 420 can be in direct communication over a dedicated communication line.

In one example, the remote server 440 can store a user profile associated with the remote user 410. The user profile at the remote server 440 can include a variety of information, including user input (e.g., at the computing device 420) by the remote user 410. Such information can include predefined preferences. For example, the user profile can include contact information corresponding to different types of data received at the remote server 440 from the apparatus 100. This may allow the remote server 440 to use one contact, or means or communication, for a first type of data and a second, different contact, or means of communication for a second, different type of data received from the apparatus 100. As another example, the user profile can include maintenance related information for the apparatus 100. For instance, the remote user 410 may predefine a period of time over which the sump pump is to have been turned on at least once. If information received from the apparatus 100 indicates that the sump pump has not been turned on once over the predefined period of time, a notification can be sent to the computing device 420 and/or a control signal can be sent to the apparatus 100 to turn the sump pump on.

When included, the control panel 460 can be in communication with the apparatus 100, the remote server 440, and/or the computing device 420. In such embodiments where the control panel 460 is included, the control panel 460 can serve as an intermediary for communication between the apparatus 100 and the remote server 440 and/or computing device 420. As shown in the illustrated example, the control panel 460 is in communication with the apparatus 100 via a wired connection 465, but in other examples the control panel 460 may be in wireless communication with the apparatus 100. As also shown in the illustrated example, the control panel 460 is in communication with the remote server 440 over the communication line 450. In this example, the control panel 460 can be in communication with the computing device 420 through the remote server 440, though in other examples the control panel 460 can be in direct communication with the computing device 420 over a dedication communication line.

The control panel 460 can receive, from the apparatus 100, information related to the apparatus 100 and send one or more control signals to the apparatus 100. As one example, the control panel 460 can track instances of sump pump actuation by the apparatus 100 and/or monitor for indications that the sump pump, or related pump actuation component(s), may not be operating properly as described further below. The control panel 460 may send this information related to the apparatus 100 to the remote server 440 and/or the computing device 420 to allow for remote monitoring. As another example, the control panel 460 can have one or more local settings thereat (e.g., stored in a local memory component at the control panel 460) that can be used as a basis for sending one or more control signals to the apparatus 100. In one case, local settings at the control panel 460 can be set and/or adjusted by input at the computing device 420 or the remote server 440. For instance, the control panel 460 can use one or more local settings as the basis to send a control signal to the apparatus 100 to actuate the sump pump. Such an exemplary local setting could include, for instance, a predetermined time period since the most recent actuation of the sump pump or receipt of an indication from the apparatus 100 that the sump pump or related pump actuation component may not be operating properly.

Figure 5A:
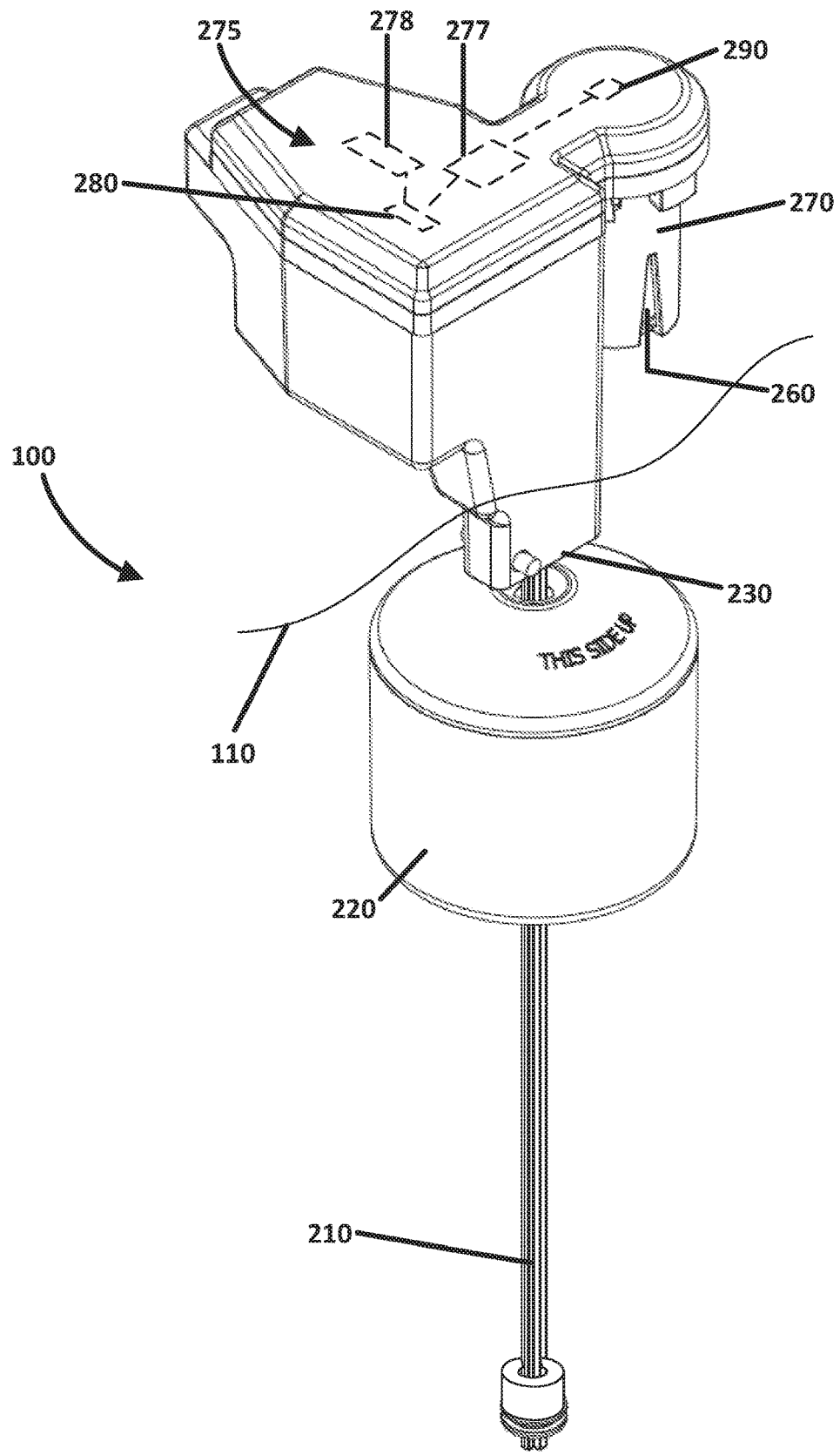
FIGS. 5A and 5B are perspective views of the exemplary embodiment of the apparatus including the monitoring unit.
Figure 5B:
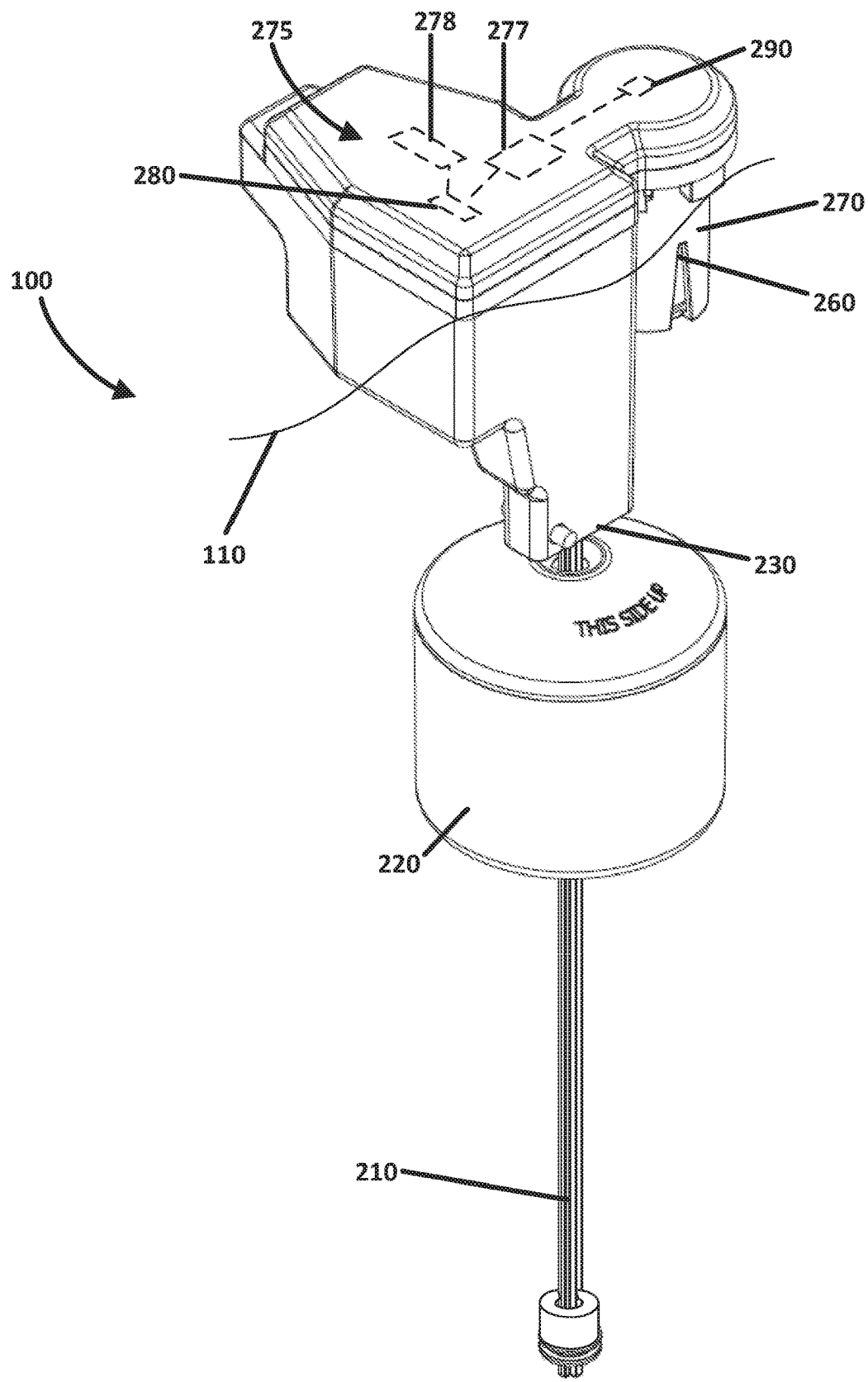

FIGS. 5A and 5B are perspective views of the exemplary embodiment of the apparatus 100 including a monitoring unit 275. FIG. 5A shows a first fluid level 110 and FIG. 5B shows a second elevated fluid level 110. In some embodiments, as described further herein, the monitoring unit 275 can include one or more components that can serve as a backup sump pump monitor and/or control when the second elevated fluid level 110 becomes present. The apparatus 100 can be the same as, or similar to, that described herein. In one example, the monitoring unit 275 can be an independent component that can be coupled (e.g., retrofit) to the apparatus 100. However, in another example, the monitoring unit 275 can be an integral component of the apparatus 100.

In various embodiments, the monitoring unit 275 can be used to provide remote monitoring and/or control of the apparatus 100. In one example, the monitoring unit 275 includes a counter 280. The counter 280 can be configured to monitor actuation of the switch at the apparatus 100. For instance, the counter 280 can be track a number of times the switch, and thus the sump pump, is actuated. As one example of this, the counter 280 can be configured to track a number of times the arm of the apparatus moves between the first arm position and the second arm position within an amount of time.

The counter 280 can be any one of a variety of components useful for monitoring actuation of the switch at the apparatus 100. In one embodiment, the counter 280 can include a monitoring switch configured to alternate between an opened state and a closed state as a result of the arm moving between the first arm position and the second arm position. One such type of monitoring switch that could be included as part of the counter 280 is a reed switch. When used as part of the counter 280, the reed switch need not be in physical contact with the switch and/or the arm of the apparatus. Instead, the reed switch can change states due to the presence of a magnetic field created when the arm magnet is moved closer to the reed switch. The reed switch of the counter 280 can be positioned at the monitoring unit 275 so that the reed switch can change from the opened state to the closed state when the arm of the apparatus 100 is in the second arm position. In such an embodiment, the counter 280 can be configured to track a number of times that the reed switch is in the closed state. For example, in addition to a monitoring switch (e.g., the reed switch), the counter 280 can include circuitry configured to convey an electrical signal when the monitoring switch is closed. The counter 280 can then monitor for such an electrical signal as a way to track a number of times that the monitoring switch is in the closed state.

In addition to the counter 280, the monitoring unit 275 can include a communication component 277. Depending on the embodiment, the communication component 277 can be a transmitter and/or receiver (e.g., a transceiver). The communication component 277 of the monitoring unit 275 can be configured to transmit information related to the apparatus 100 to a remote server and/or remote computing device, such as described in reference to the system shown in FIG. 4. As one example, the communication component 277 can be configured to transmit, to the remote server, the number of times that the switch of the apparatus 100 is actuated (e.g., the number of times that the arm of the apparatus moves between the first arm position and the second arm position). In another embodiment, the communication component 277 could instead reside at the control panel 460 where information related to the apparatus 100 could be transmitted.

The counter 280 and communication component 277 can be used together to collect and convey information, related to the apparatus 100, to a remote system device (e.g., the remote server and/or the remote computing device). In some cases, this information can then be used as a basis for sending a control signal to the apparatus 100. For instance, using information related to the number of times that the switch of the apparatus 100 has been actuated, the remote server or remote computing device can send a control signal to the communication component 277 to actuate the switch and thereby cause the sump pump to run. This control signal could be sent to the apparatus 100 when the information received from the apparatus 100 indicates that the switch has not been actuated, and thus the sump pump has not been run, over a predefined period of time. In this way, a remote user may be able to send a command to run the sump pump as a maintenance function and thereby may be able to prevent problems from occurring with the sump pump when it has not been active for the predefined period of time.

In certain embodiments, in addition to, or as an alternative to, monitoring actuation of the switch, the monitoring unit 275 can be used to provide backup sump pump monitoring and/or control. To do so, the monitoring unit 275 can include a secondary float 260 and a monitor 290. The secondary float 260 may not be carried by the rod 210 and thus can be separate from the float 220 (e.g., configured to be movable independent of the rod 210). As shown in the illustrated embodiment, the secondary float 270 may be held within a basket 270 and move relative to the basket 270 as the fluid level 110 rises and falls within a certain fluid level 110 range. The monitor 290 can be configured to detect when the secondary float 260 has moved upwardly. For instance, the secondary float 260 can be configured to move upwardly after the float 220 is supposed to have moved the rod 210 to the second rod position, and thereby actuate the switch, as a result of the fluid level 110. In this way, the secondary float 260 and the monitor 290 can serve to detect an instance when the fluid level 110 has risen to a level that should have resulted in actuation of the switch but for some reason the switch was not actuated.

FIGS. 5A and 5B illustrate the fluid level 110 at different positions. FIG. 5A illustrates a time at which the fluid level 110 has risen above the first float stop 230. At this fluid level 110, the float 220 has been brought into contact with the first float stop 230 and moved the rod 210 to the second rod position. As described previously, ordinarily this should act to actuate the switch of the apparatus and thereby turn the sump pump on. As shown, the fluid level 110 present in FIG. 5A has not yet risen to the level of the secondary float 260. Thus, the secondary float 260 may have a lower-most position (e.g., a first secondary float position) that is above a plane associated with a position of the float 220 that brings the rod to the second rod position. If any one or more of certain components of the apparatus 100 are not functioning properly the fluid level 110 in FIG. 5A may not result in the switch being actuated as intended in normal operation.

FIG. 5B illustrates a time at which the fluid level 110 has risen above that in FIG. 5A and reached a level of the secondary float 260. As the fluid level 110 continues to rise, it can move the secondary float 260. For example, the fluid level 110 can move the secondary float 260 upward from a first, lower secondary float position (e.g., where the secondary float 260 rests on a base of the basket 270) to a second, higher secondary float position.

As noted previously, the monitor 290 can be configured to detect when the secondary float 260 has moved. For example, the monitor 290 can be configured to detect when the secondary float 260 has moved upwardly, such as from the first secondary float position to a second secondary float position. In some embodiments, the monitor 290 can include a monitoring switch configured to alternate between an opened state and a closed state as a result of the secondary float 260 moving relative to the monitoring switch. As one example, the secondary float 260 can include a magnet and the monitor 290 can include a reed switch. The reed switch of the monitor 290 can be positioned at the monitoring unit 275 at a location that is generally aligned with an axis along which the secondary float 260 moves upward and downward. In this example, the reed switch need not be in physical contact with the secondary float 260. Instead, the reed switch can change states due to the presence of a magnetic field created when the magnet of the secondary float 260 is moved closer to the reed switch. When the reed switch is thus brought to a closed state, a circuit of the monitor 290 can output an electrical signal indicating this closed state.

When the monitor 290 detects that the secondary float 260 has moved, the monitor 290 can generate a signal corresponding to an abnormally high fluid level 110 (e.g., the electrical signal output when the reed switch is in the closed state). This signal can be used in a number of ways. For example, the monitoring unit 275 may include a secondary switch 278 configured to turn the sump pump on and off. In one instance, the signal generated by the monitor 290 can directly cause the secondary switch 278 to actuate and turn the sump pump on. In another instance, the signal generated by the monitor 290 can trigger the communication component 277 to transmit an alert to the remote server and/or the remote computing device indicating the presence of an abnormally high fluid level 110. Thus, the communication component 277 can be configured to transmit the alert to the remote server and/or the remote computing component when the monitor 290 detects that the secondary float 260 has moved upwardly (e.g., from the first to the second secondary float positon). The remote server and/or the remote computing device can then send a control signal, representative of a command, back to the communication component 277 to actuate the secondary switch 278 and thereby turn the sump pump on based on this control signal. In this way, the monitoring unit 275 can serve as a fail-safe if the apparatus 100 were to malfunction in turning the sump pump on at the intended fluid level.

Figure 6:
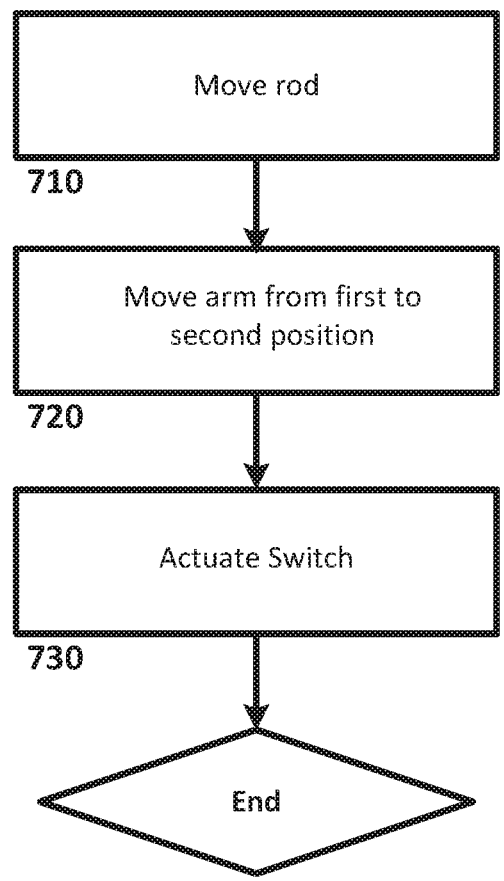
FIG. 6 is a flow diagram of an exemplary embodiment of a method for turning a sump pump on and/or off.

FIG. 6 illustrates a flow diagram of an exemplary embodiment of a method 700 for turning a sump pump on and/or off. For instance, the exemplary method 700 can serve to monitor and regulate a fluid level in a basin 120 using an apparatus, such as the apparatus described herein, to actuate a switch and thereby turn the sump pump on and off.

At step 710, a rod of the apparatus described herein can be moved from a first rod position to a second rod position. When the rod is moved to the second rod position, a rod magnet carried by the rod can be located within a housing of the apparatus. In many embodiments, the rod can be moved from the first rod positon to the second rod position by a float carried at the rod. The float can be carried on a surface of the fluid level and can thereby force the rod from the first rod positon to the second rod position as the fluid level rises.

At step 720, an arm of the apparatus is moved from a first arm position to a second arm position. At the first arm position, the arm may not actuate an actuating tab of the switch. At the second arm position, the arm may actuate the actuating tab of the switch. The arm can carry an arm magnet having first and second opposed surfaces and an edge surface that extends between the first and second opposed surfaces. The arm can be moved from the first arm position to the second arm position by a magnetic force imparted by the rod magnet when the rod is moved to the second rod position. As the arm moves from the first arm position to the second arm position, the edge surface of the arm magnet can move across a facing surface of the rod magnet. In one embodiment, when the arm is in the second arm position the first and second opposed surfaces of the arm magnet can be oriented substantially perpendicular to the facing surface of the rod magnet.

At step 730, the actuating tab of the switch is actuated thereby turning the sump pump on. The actuating tab can be actuated by the arm when the arm is moved to the second arm position. For instance, the actuating tab can be actuated by the arm when a flat arm surface of the arm is positioned flush against a flat switch surface of a switch housing causing the actuating tab to actuate the switch in a manner that fully closes the switch When the switch is actuated, electrical potential may be supplied to sump pump causing the sump pump to turn on and adjust a fluid level within the basin.

Further embodiments of the method 700 can include generating an alert and/or receiving a control signal. For example, a step could be included for tracking a number of times the arm moves between the first arm position and the second arm position. The number of times that the arm is tracked as moving between the first arm position and the second arm position can be transmitted to a remote server and/or remote computing device. The apparatus can receive a control signal, in response to the tracking transmission, which causes the switch to be actuated and turn the sump pump on. In another example, a step could be included, in addition to or as an alternative to the tracking step, transmitting an alert from the apparatus to the remote server and/or remote computing device when a monitor of the apparatus detects that a secondary float has moved upwardly from one position to another position corresponding to a higher fluid level. The apparatus can receive a control signal, in response to the alert transmission, which causes a secondary switch of the apparatus to be actuated and turn the sump pump on.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. An apparatus for turning a sump pump on and off, the apparatus comprising:
a housing;
a switch housed by the housing and including an actuating tab;
an arm housed by the housing and carrying an arm magnet, the arm magnet including first and second opposed surfaces and an edge surface; and
a rod carrying a float and a rod magnet, the rod magnet including a facing surface, the rod being movable between a first rod position and a second rod position, with the rod magnet being in the housing when the rod is in the second rod position,
wherein the first surface of the arm magnet is positioned nearer to the actuating tab than is the second surface of the arm magnet, and the facing surface of the rod magnet repels the first surface of the arm magnet and attracts the second surface of the arm magnet, and
wherein:
as the rod moves from the first rod position to the second rod position, the edge surface of the arm magnet is configured to move across the facing surface of the rod magnet, thereby moving the arm from a first arm position in which the arm does not actuate the actuating tab to a second arm position in which the arm actuates the actuating tab, and
as the rod moves from the second rod position to the first rod position, the arm is configured to move from the second arm position to the first arm position.

2. The apparatus of claim 1, wherein the first and second opposed surfaces of the arm magnet are oriented substantially perpendicularly to the facing surface of the rod magnet when the arm is in the second arm position.

3. The apparatus of claim 1, wherein the switch is configured to turn on the sump pump when the actuating tab is actuated.

4. The apparatus of claim 1, wherein the actuating tab is biased open and is configured to push the arm from the second arm position to the first arm position as the rod moves from the second rod position to the first rod position and to keep the arm in the first arm position until the rod moves back to the second rod position.

5. The apparatus of claim 1, wherein the housing includes a support about which the arm pivots as it moves between the first arm position and the second arm position, and wherein the arm magnet is carried by the arm at a location on the arm that is spaced from the support.

6. The apparatus of claim 5, wherein:
the switch includes a flat switch surface from which the actuating tab protrudes; and
the arm includes a flat arm surface that is positioned flush against the flat switch surface when the arm is in the second arm position.

7. The apparatus of claim 1, further comprising a counter configured to track a number of times the arm moves between the first arm position and the second arm position within an amount of time.

8. The apparatus of claim 7, further comprising a transmitter configured to transmit the number of times to a remote server.

9. The apparatus of claim 7, wherein the counter includes a monitoring switch configured to alternate between an opened state and a closed state as a result of the arm moving between the first arm position and the second arm position.

10. The apparatus of claim 9, wherein the monitoring switch comprises a reed switch that is not in physical contact with either the switch and/or the arm.

11. The apparatus of claim 10, wherein the reed switch changes from the opened state to the closed state when the arm is in the second arm position, and wherein the counter is configured to track the number of times that the reed switch is in the closed state.

12. The apparatus of claim 1, further comprising:
a secondary float not carried by the rod; and
a monitor configured to detect when the secondary float has moved upwardly.

13. The apparatus of claim 12, further comprising a transmitter configured to transmit an alert to a remote server when the monitor detects that the secondary float has moved upwardly.

14. The apparatus of claim 12, wherein the secondary float is configured to move upwardly after the float is supposed to have moved the rod to the second rod position.

15. The apparatus of claim 12, wherein the monitor includes a monitoring switch configured to alternate between an opened state and a closed state as a result of the secondary float moving relative to the monitoring switch.

16. The apparatus of claim 15, wherein the secondary float includes a magnet, and the monitoring switch includes a reed switch.

17. The An apparatus of claim 1, for turning a sump pump on and off, the apparatus comprising:
  a housing;
  a switch housed by the housing and including an actuating tab;
  an arm housed by the housing and carrying an arm magnet, the arm magnet including first and second opposed surfaces and an edge surface; and
  a rod carrying a float and a rod magnet, the rod magnet including a facing surface, the rod being movable between a first rod position and a second rod position, with the rod magnet being in the housing when the rod is in the second rod position, wherein the rod further includes first and second float stops, and wherein:
    as the float engages the first float stop, the rod is configured to move from the first rod position to the second rod position, and
    as the float engages the second float stop, the rod is configured to move from the second rod position to the first rod position, and wherein:
    as the rod moves from the first rod position to the second rod position, the edge surface of the arm magnet is configured to move across the facing surface of the rod magnet, thereby moving the arm from a first arm position in which the arm does not actuate the actuating tab to a second arm position in which the arm actuates the actuating tab, and
    as the rod moves from the second rod position to the first rod position, the arm is configured to move from the second arm position to the first arm position.

18. The apparatus of claim 17, wherein the first surface of the arm magnet is positioned nearer to the actuating tab than is the second surface of the arm magnet, and the facing surface of the rod magnet repels the first surface of the arm magnet and attracts the second surface of the arm magnet.

19. A system for monitoring a sump pump, the system comprising:
  an apparatus that includes:
    a housing;
    a switch housed by the housing and including an actuating tab;
    an arm housed by the housing and carrying an arm magnet, the arm magnet including first and second opposed surfaces and an edge surface; and
    a rod carrying a float and a rod magnet, the rod magnet including a facing surface, the rod being movable between a first rod position and a second rod position, with the rod magnet being in the housing when the rod is in the second rod position,
  wherein the first surface of the arm magnet is positioned nearer to the actuating tab than is the second surface of the arm magnet, and the facing surface of the rod magnet repels the first surface of the arm magnet and attracts the second surface of the arm magnet, and
  wherein:
    as the rod moves from the first rod position to the second rod position, the edge surface of the arm magnet is configured to move across the facing surface of the rod magnet, thereby moving the arm from a first arm position in which the arm does not actuate the actuating tab to a second arm position in which the arm actuates the actuating tab, and
    as the rod moves from the second rod position to the first rod position, the arm is configured to move from the second arm position to the first arm position; and
  a remote server configured for wireless communication with the apparatus to receive data related to the sump pump, and wherein the remote server is configured to transmit data related to the sump pump to a remote user computing device.

20. The system of claim 19, wherein the apparatus further comprises:
  a counter configured to track a number of times the arm moves between the first arm position and the second arm position within an amount of time; and
  a transmitter configured to transmit the number of times to the remote server.

21. The system of claim 19, wherein the apparatus further comprises:
  a secondary float not carried by the rod;
  a monitor configured to detect when the secondary float has moved upwardly; and
  a transmitter configured to transmit an alert to the remote server when the monitor detects that the secondary float has moved upwardly.

22. The system of claim 19, wherein the apparatus further comprises:
  a receiver configured to receive a control signal from the remote server, the control signal being representative of a command provided by the remote user computing device; and
  a secondary switch configured to turn the sump pump on and off based on the control signal.

* * * * *